US006341789B1

United States Patent
Checa et al.

(10) Patent No.: US 6,341,789 B1
(45) Date of Patent: Jan. 29, 2002

(54) TWO-WHEELED HAND CART FOR TRANSPORTING SCUBA GEAR

(76) Inventors: Frank Checa; Michael Moorrees, both of 211 S. Wilson Ave. #203, Pasadena, CA (US) 91106

(*) Notice: Subject to any disclaimer, the term of this patent is extended or adjusted under 35 U.S.C. 154(b) by 0 days.

(21) Appl. No.: 09/470,319

(22) Filed: Dec. 21, 1999

Related U.S. Application Data

(60) Provisional application No. 60/113,023, filed on Dec. 21, 1998.

(51) Int. Cl.$^7$ ............................................. B62B 1/00
(52) U.S. Cl. ................................................. 280/47.28
(58) Field of Search ........................... 280/47.26, 47.28, 280/47.27, 47.24

(56) References Cited

U.S. PATENT DOCUMENTS

| | | | | |
|---|---|---|---|---|
| 593,226 A | * | 11/1897 | Macphail | 280/47.27 |
| 690,449 A | * | 1/1902 | Martin | 280/47.27 |
| 5,106,112 A | * | 4/1992 | Sargent | 280/40 |
| 5,131,670 A | * | 7/1992 | Clements et al. | 280/35 |
| 5,203,815 A | * | 4/1993 | Miller | 43/21.1 |
| 5,393,080 A | * | 2/1995 | Ross | 280/47.26 |
| 5,419,569 A | * | 5/1995 | Walla | 280/47.27 |
| 5,433,230 A | * | 7/1995 | Miller | 134/110 |
| 5,492,346 A | * | 2/1996 | Stadler et al. | 280/47.19 |
| D374,533 S | * | 10/1996 | Read | D34/24 |
| 5,704,624 A | * | 1/1998 | Davis | 280/47.34 |
| 6,047,983 A | * | 4/2000 | Day, III | 280/652 |
| 6,082,757 A | * | 7/2000 | Lin | 280/654 |
| 6,123,344 A | * | 9/2000 | Clegg | 280/47.26 |

* cited by examiner

*Primary Examiner*—J. J. Swann
*Assistant Examiner*—James S. McClellan
(74) *Attorney, Agent, or Firm*—Stetina Brunda Garred & Brucker

(57) ABSTRACT

A two-wheeled cart for transporting scuba diving equipment is disclosed. The cart comprises an elongate sheet defining a top end, a bottom end, a generally planar front surface and a generally planar back surface. A base is attached to the bottom end of the sheet and extends at an angle of approximately ninety degrees relative to the front surface. Additionally, a pair of guides are attached to and extend from the back surface of the sheet in spaced relation to each other. An elongate shaft defines a shaft axis, with the shaft being rotatably connected to the guides. A pair of wheels attached to the shaft. Additionally, a support member attaches to and extends from the back surface of the sheet, between the shaft and the top end, with the support member defining a distal end and being sized such that the distal end terminates at approximately the shaft axis.

6 Claims, 4 Drawing Sheets

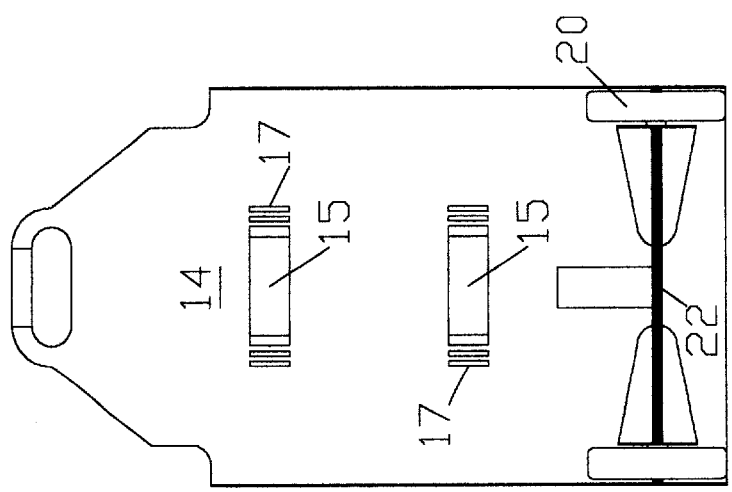
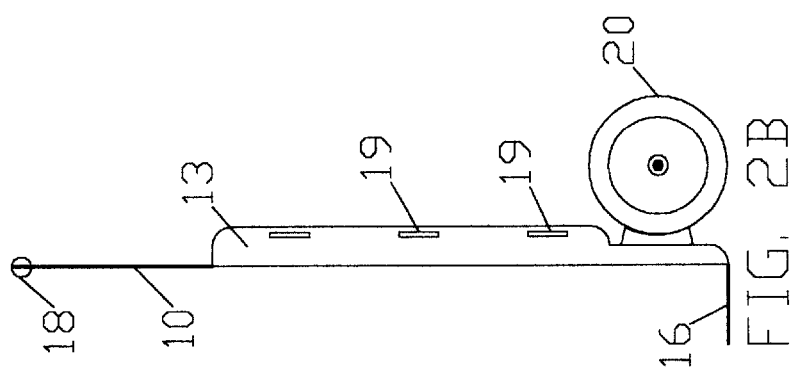
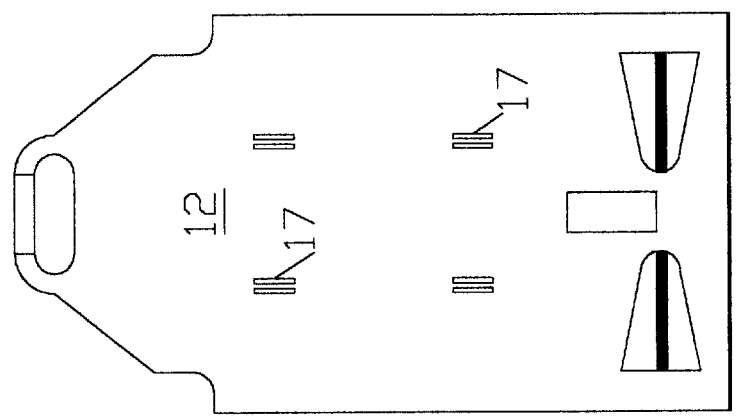
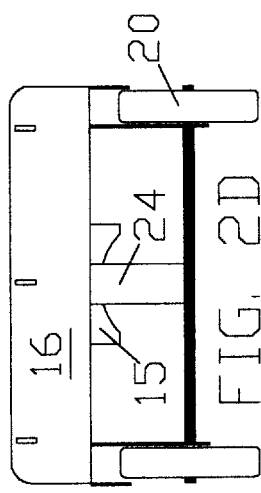

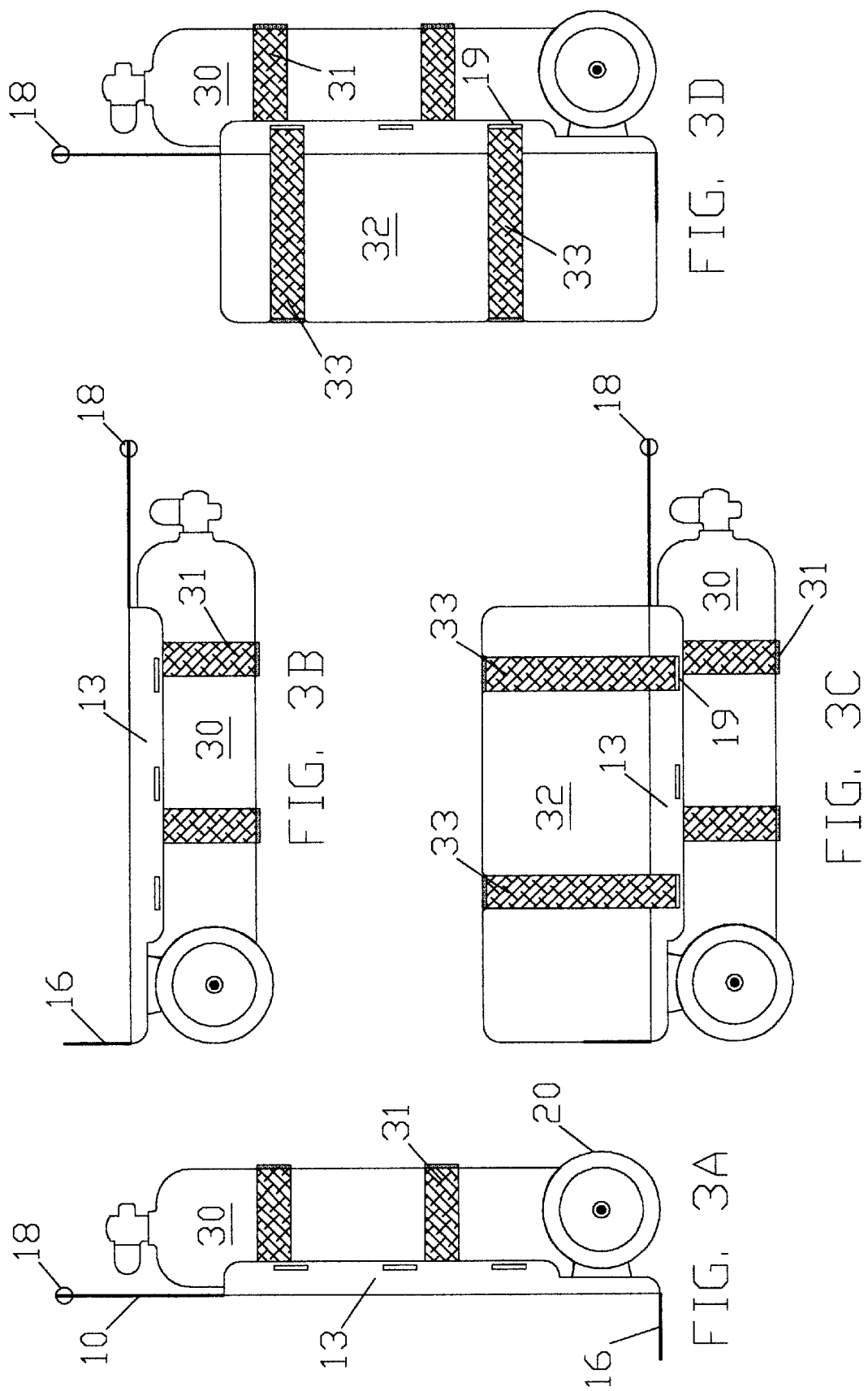

TWO-WHEELED HAND CART FOR TRANSPORTING SCUBA GEAR

This appln claims benefit of Prov. No. 60/113,023 filed Dec. 21, 1998.

BACKGROUND OF THE INVENTION

1. Field of the Invention

This invention relates to hand carts or dollies and more particularly to a two-wheeled handcart, which is specially suited for transporting scuba air tanks and gear on two surfaces of one and the same frame.

2. Description of the Related Art

A conventional hand cart or dolly comprises a generally upright frame with a base plate at the bottom end of the cart or dolly for carrying a load as described in the following patents:

| U.S. PAT. NO. | INVENTOR(S)/ASSIGNEE |
| --- | --- |
| 5,803,471 | DeMars |
| 5,738,480 | Butzen |
| 4,241,930 | Bell |

Transporting more than one type of cargo, like a gear bag and air tank, in a single cart or dolly is not an practical option with existing hand carts, like those provided by the following patents:

| U.S. PAT. NO. | INVENTOR(S)/ASSIGNEE |
| --- | --- |
| 5,704,624 | Davis |
| D374,533 | Read |
| 5,492,346 | Stadler |
| 5,393,080 | Ross |

This creates a problem for scuba divers in particular, where they have to resort to using conventional carts or dollies to carry their gear usually a substantial distance in multiple trips.

It is therefore desirable to have a handcart that can be loaded easily with all required scuba gear and towed in a single trip.

Loading the scuba equipment onto existing carts such as the one described in U.S. Pat. No. 5,704,624, allowing multiple loads, requires that the carrier be reconfigured and/or partially disassembled to access the loads.

It is therefore desirable to have a handcart that allows access to either of both loads without reconfiguring and/or partially disassembling the cart.

SUMMARY OF THE INVENTION

It is an object of the present invention to provide a handcart that optimizes its frame surfaces to retain and transport scuba gear in an easy, convenient and efficient manner.

Another objective of the present invention is to provide a handcart that can maintain its upright position without operator intervention regardless of the loading arrangement.

Another objective of the present invention is to provide a handcart with retaining means that adjust and conform to the shape and contour of the loads.

The handcart of the present invention includes a generally upright frame having opposed functional surfaces, one of which provides the retaining means for the air tank, while the other allows for the loading of the gear bag, with a base plate and wheels at the bottom for stability.

DESCRIPTION OF THE SEVERAL VIEWS OF THE DRAWING

Referring now to the drawings in which like reference numbers represent corresponding parts throughout:

FIGS. 2a, 2b, 2c, and 2d are front, side, back and bottom views respectably of the scuba cart of FIG. 1 in an unloaded state;

FIG. 3a is a side view of the scuba cart of FIG. 1 standing vertically with a scuba tank loaded;

FIG. 3b is a side view of the scuba cart of FIG. 1 resting horizontally with a scuba tank loaded;

FIG. 3c is a side view of the scuba cart of FIG. 1 resting horizontally with a scuba tank and a gear bag loaded;

FIG. 3d is a side view of the scuba cart of FIG. 1 standing vertically, with a scuba tank and a gear bag loaded;

DETAILED DESCRIPTION OF THE INVENTION

Figure 1A:
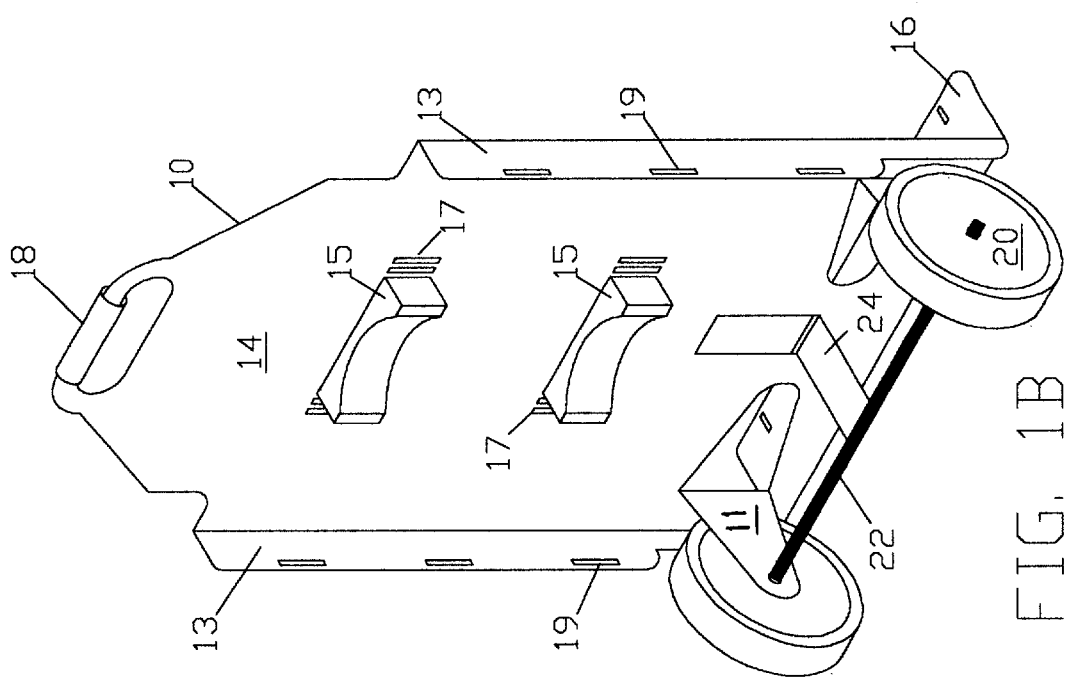
FIGS. 1a, 1b are a top perspective views of the scuba cart of the present invention.
Figure 1B:
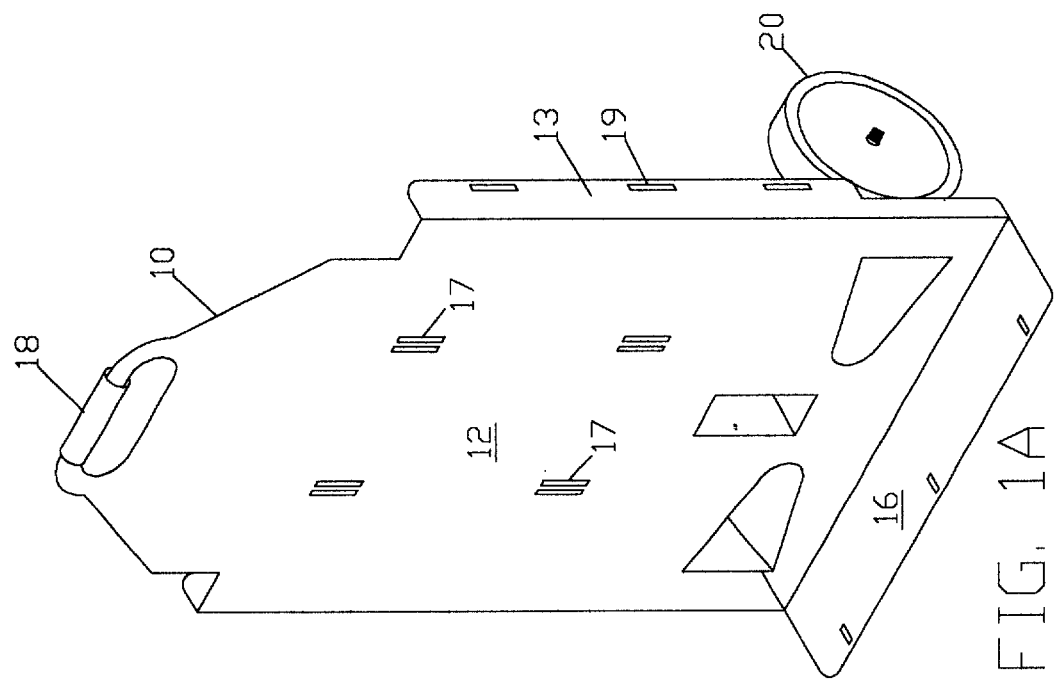

The cart of the present invention as presented in FIGS. 1A and 1B, is formed from a rectangular sheet of material. The sheet material can be any material that is strong, light weight, non-corrosive, and relatively inexpensive. Because of such requirements, aluminum sheeting will be used in the following description.

The cart frame 10 consists of a rectangular sheet having a top and a bottom end. For reference, The bottom end is formed by bending the sheet at 90 degrees towards what will be regarded henceforth as the front surface 12 thus forming the base 16 of the cart. Cutting the upper third of the frame following the outline presented in the drawings of this invention, forms the top end. The sides 13 of the lower two thirds of the frame are bent 90 degrees towards what will henceforth be identified as the back surface 14 thus forming an U-shape.

The frame 10 has an oval shaped opening at the top end for the handle 18. Additionally, there are (8) slotted openings 17 that serve as loops for tank straps 31. There are (3) slotted openings 19 on each of the side surfaces 13 of the cart to be used to for gear bag straps 33.

The cart has also two generally triangular shaped openings that form a member where the base of the triangle is bent 90 degrees towards the back surface 14 to serve as axis/shaft guides 11. A three sided rectangular opening forms a support member 24 that is bent 90 degrees at a point in line with the upper outer diameter of the shaft 22 and equal in length to the distance from the back surface 14, to the mid point of the shaft 22. The support member 24 provides a resting surface for the scuba tank 30.

The back surface 14 further contains two generally rectangular foam members 15 that serve as scuba tank guides.

Although the cart FIGS. 1A and 1B of the present invention is adapted for use by scuba divers, other applications of the cart may be employed because of its practicality, versatility, simplicity, and inexpensive construction.

The following operation description of the cart FIGS. 1A and 1B of the present invention is described using scuba diving as the example operation.

In operation, a scuba diver would load his diving equipment onto the cart in the following manner:

With the cart in the vertical position and having access to the back side 14 of the cart FIG. 1B, the diver would load the tank 30 by resting it on the tank support 24 and aligning it with tank guides 15, looping the tank straps 31 around the tank 30, pulling on the tank straps 31 so as to keep the tank 30 firmly in place by means of the hook & loop (Velcro) material (not shown) for an tight fit.

Positioning the cart horizontally FIG. 3B, the diver has access to the front surface 12 of the cart, now acting as a platform where the diver can load his gear bag 32, and securing it with the bag straps 33.

Figure 4C:
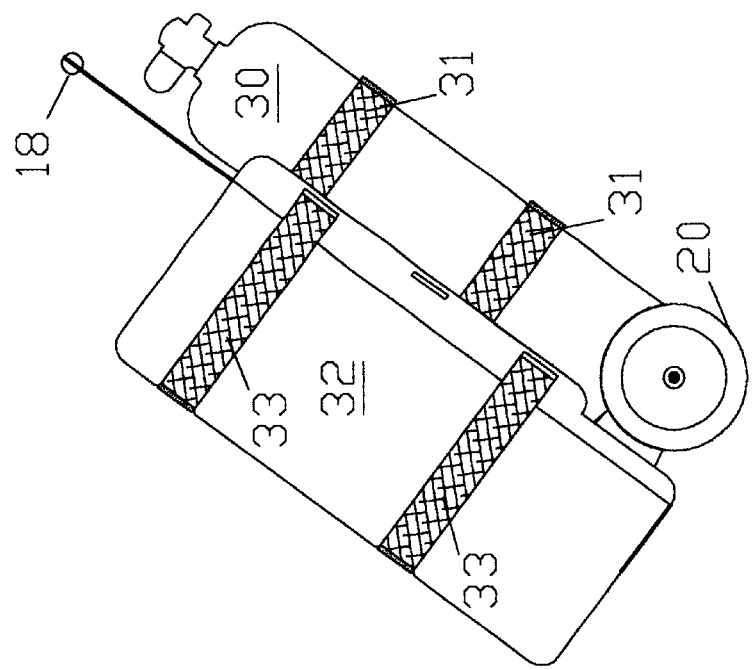
FIG. 4c is a side view of the scuba cart of FIG. 1 in tow, with a scuba tank and a gear bag loaded.
Figure 4B:
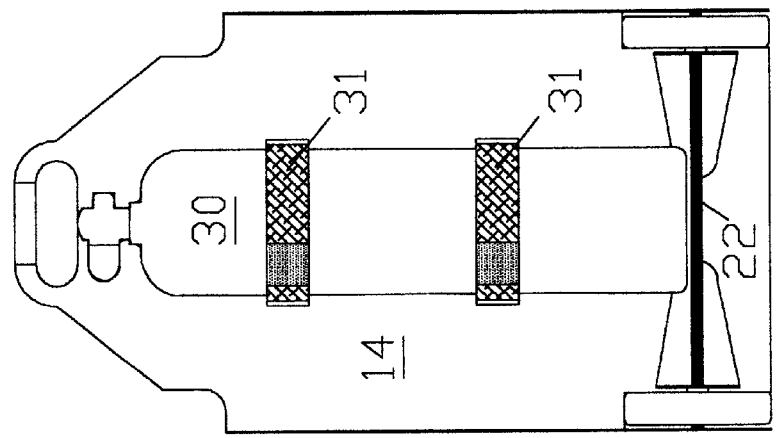
FIG. 4b is a back view of the scuba cart of FIG. 1 standing vertically, with a scuba tank loaded.
Figure 4A:
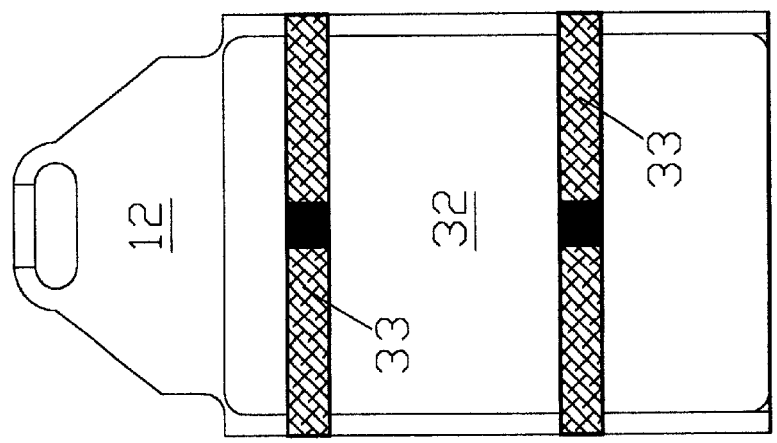
FIG. 4a is a front view of the scuba cart of FIG. 1 standing vertically, with a gear bag loaded.

With the equipment loaded FIG. 3D, partially loaded FIG. 3A, or unloaded FIGS. 2A, 2B, 2C, the cart maintains its verticality and ready to be towed FIG. 4C. In the unloading process, although either loaded surface can be unloaded first, it is recommended that the gear bag 32 be unloaded first while the tank 30 still loaded and provides the clearance so that the handle 18 does not touch the ground.

While those skilled in the art may make modification to the preferred embodiments, those modifications may nonetheless fall within the spirit and scope of the following claims.

What is claimed is:

1. A two-wheeled cart for transporting scuba diving equipment, the cart comprising:

an elongate sheet defining a top end, a bottom end, a generally planar front surface and a generally planar back surface;

a base attached to the bottom end of the sheet and extending at an angle of approximately ninety degrees relative to the front surface thereof;

a pair of guides attached to and extending from the back surface of the sheet in spaced relation to each other;

an elongate shaft defining a shaft axis, the shaft being rotatably connected to the guides;

a pair of wheels attached to the shaft;

a support member attached to and extending from the back surface of the sheet between the shaft and the top end, the support member defining a distal end and being sized such that the distal end terminates at approximately the shaft axis;

an attachment mechanism for maintaining the scuba equipment in abutting contact with at least one of the front and back surfaces of the sheet, the attachment mechanism comprising:

a plurality of slotted openings formed in the sheet;

a series of elongate straps advanceable through the slotted openings in the sheet; and an adhesive material on the end of each of the elongate straps which releasably fastens to itself; and a plurality of generally rectangular foam members attached to the back surface, the foam members being sized and configured to support a scuba tank.

2. The cart of claim 1, wherein the base is integrally connected to the sheet and formed by bending the bottom end at an angle of approximately ninety degrees relative to the front surface.

3. The cart of claim 1 wherein the guides are integrally connected to the sheet and formed by bending portions of the sheet to an angle of approximately ninety degrees relative to the back surface.

4. The cart of claim 1, wherein the support member is integrally connected to the sheet and formed by bending a portion of the sheet to an angle of approximately ninety degrees relative to the back surface.

5. The cart of claim 1, wherein the adhesive material is a hook and loop material.

6. The cart of claim 1, wherein a handle is integrally formed into the top end of the sheet.

* * * * *